United States Patent
Zhou et al.

(10) Patent No.: US 11,130,898 B2
(45) Date of Patent: Sep. 28, 2021

(54) TREATMENT FLUIDS CONTAINING HIGH DENSITY IODIDE BRINES

(71) Applicant: Halliburton Energy Services, Inc., Houston, TX (US)

(72) Inventors: Hui Zhou, The Woodlands, TX (US); Chesnee Lae Davis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/568,951

(22) Filed: Sep. 12, 2019

(65) Prior Publication Data

US 2020/0172787 A1 Jun. 4, 2020

Related U.S. Application Data

(60) Provisional application No. 62/772,742, filed on Nov. 29, 2018.

(51) Int. Cl.
| | |
|---|---|
| *C09K 8/28* | (2006.01) |
| *C09K 8/10* | (2006.01) |
| *C09K 8/12* | (2006.01) |
| *E21B 21/00* | (2006.01) |

(52) U.S. Cl.
CPC ............ *C09K 8/28* (2013.01); *C09K 8/10* (2013.01); *C09K 8/12* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 6,635,604 B1 | 10/2003 | Halliday et al. | |
| 8,901,048 B2 | 12/2014 | Collins et al. | |
| 9,868,890 B2 | 1/2018 | Alleman | |
| 2013/0098615 A1* | 4/2013 | Perez | C09K 8/032 |
| | | | 166/297 |
| 2014/0353042 A1* | 12/2014 | Karale | C09K 8/725 |
| | | | 175/64 |
| 2014/0367100 A1* | 12/2014 | Oliveira | C09K 8/80 |
| | | | 166/280.1 |

(Continued)

FOREIGN PATENT DOCUMENTS

| | | |
|---|---|---|
| WO | 2015/041679 A1 | 3/2015 |
| WO | 2016025137 A1 | 2/2016 |
| WO | 2017/165754 A1 | 9/2017 |

OTHER PUBLICATIONS

International Search Report and Written Opinion issued in related PCT Application No. PCT/US2019/050971 dated Dec. 27, 2019, 13 pages.

(Continued)

*Primary Examiner* — Jeffrey D Washville
(74) *Attorney, Agent, or Firm* — Tenley Krueger; Baker Botts L.L.P.

(57) ABSTRACT

The present disclosure provides methods and systems for treatment fluids including an iodide brine. In some embodiments of the present disclosure, an oil-based treatment fluid in the form of an invert emulsion comprising an aqueous internal phase and an oil external phase, wherein the aqueous internal phase comprises an iodide brine is provided. The treatment fluid may be introduced into at least a portion of a well bore penetrating at least a portion of a subterranean formation.

17 Claims, 1 Drawing Sheet

(56) References Cited

U.S. PATENT DOCUMENTS

| | | | |
|---|---|---|---|
| 2016/0098615 A1 | 4/2016 | Perez et al. |
| 2017/0088762 A1 | 3/2017 | Zhang et al. |
| 2017/0145284 A1 | 5/2017 | Davidson et al. |
| 2017/0152427 A1 | 6/2017 | Liu et al. |
| 2018/0016484 A1 | 1/2018 | Ray et al. |
| 2018/0155602 A1 | 6/2018 | Zhang et al. |
| 2018/0215986 A1 | 8/2018 | Mack |
| 2018/0223172 A1 | 8/2018 | Ray et al. |
| 2018/0237679 A1 | 8/2018 | Mack |
| 2018/0320050 A1 | 11/2018 | AlBahrani et al. |
| 2019/0119548 A1 | 4/2019 | Mack et al. |
| 2019/0119556 A1 | 4/2019 | Mack et al. |
| 2019/0119557 A1 | 4/2019 | Mack et al. |

OTHER PUBLICATIONS

International Preliminary Report on Patentability issued in related PCT Application No. PCT/US2019/050971 dated Jun. 10, 2021, 8 pages.

\* cited by examiner

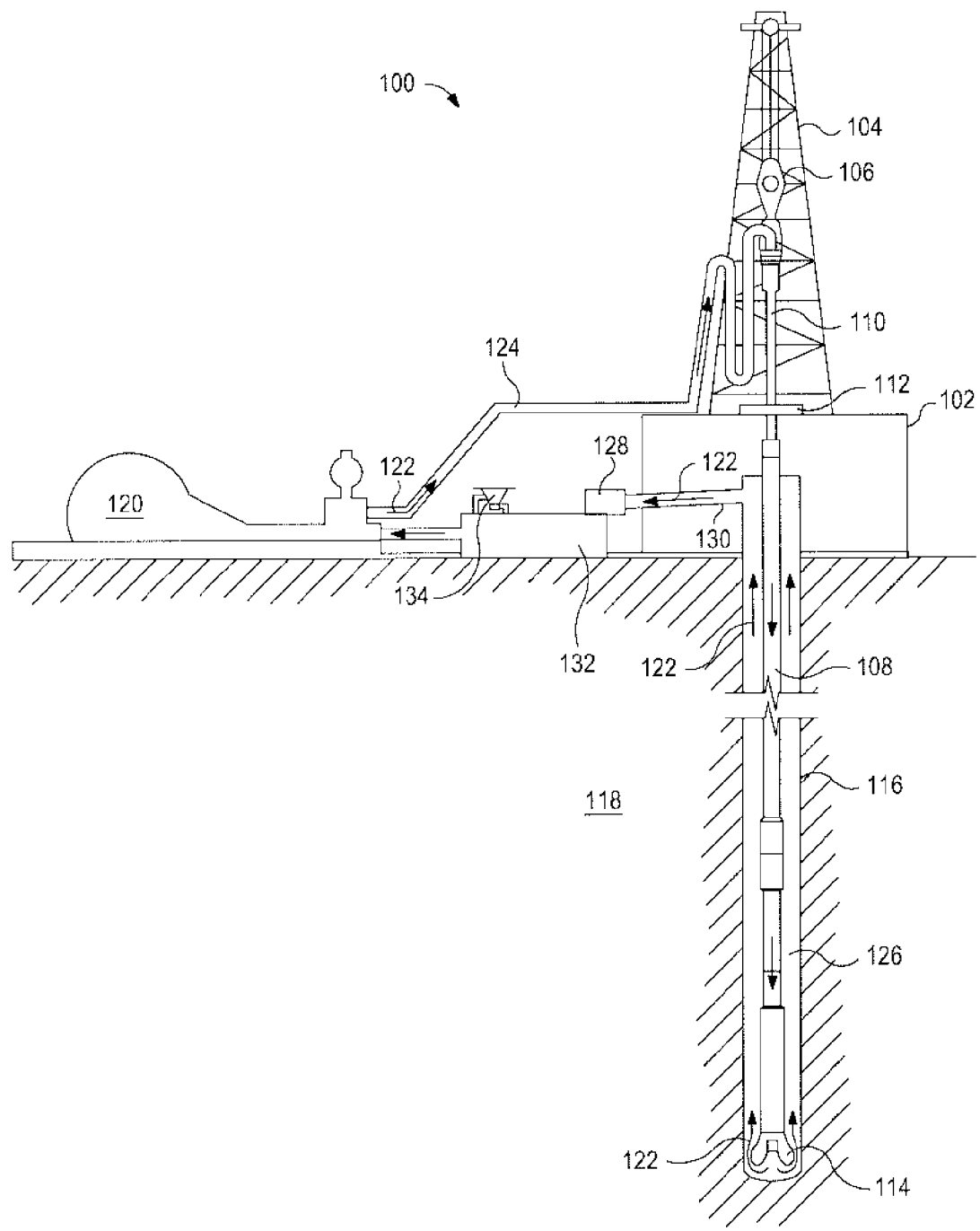

TREATMENT FLUIDS CONTAINING HIGH DENSITY IODIDE BRINES

CROSS-REFERENCE TO RELATED APPLICATION

The present application claims priority to U.S. Provisional Application Ser. No. 62/772,742 filed on Nov. 29, 2018.

BACKGROUND

The present disclosure relates to systems and methods for treating subterranean formations. More specifically, the present disclosure relates to high density iodide brine compositions and methods for using the same in subterranean formations.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations may include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes.

A treatment fluid may include an aqueous base fluid which includes water with one or more water-soluble salts dissolved therein. The one or more salts can be selected from the group of inorganic salts, formate salts, or any combination thereof. Inorganic salts can be selected from the group of monovalent salts, which can be further selected from the group consisting of: alkali metal halides, ammonium halides, alkali metal formates, ammonium formates, and any combination thereof. Brines including monovalent salts may be referred to as "monovalent brines." Monovalent salts can be used to form drilling or treatment fluids having an aqueous phase having a density up to about 13.3 lb/gal. Inorganic salts can also be selected from the group of divalent salts, such as alkaline earth metal halides (e.g., $CaCl_2$, $CaBr_2$, etc.) and zinc halides. Brines including such divalent salts may be referred to as "divalent brines."

The density of the aqueous fluid may be an important consideration for providing particulate transport and suspension in the compositions of treatment fluids. Certain monovalent brines, such as sodium chloride, potassium chloride, sodium bromide, sodium formate, and potassium formate, can only achieve densities up to about 13.3 lb/gal. Another monovalent brine, cesium formate brine, can reach a density of 19.2 lb/gal, but can be expensive to produce. Divalent brines, including zinc bromide and calcium bromide, can be used for densities above 13.3 lb/gal. However, the use of these divalent brines, especially zinc bromide, can raise environmental concerns in certain regions. Divalent brines also can have issues with compatibility with formation water, and scale formation. Therefore, there is a need for monovalent brines having densities over about 13.3 lb/gal or divalent brines as cesium formate and zinc bromide alternatives.

BRIEF DESCRIPTION OF THE DRAWINGS

These drawings illustrate certain aspects of some of the embodiments of the present disclosure and should not be used to limit or define the claims.

FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for use in subterranean formations, and more specifically, the present disclosure generally relates to treatment fluids containing high density iodide brines and methods of using such compositions in subterranean applications.

The present disclosure provides methods and systems for treatment fluids including an iodide brine. In some embodiments of the present disclosure, a treatment fluid may be provided which includes a base fluid made of an iodide brine. The treatment fluid may be introduced into at least a portion of a well bore penetrating at least a portion of a subterranean formation.

In some embodiments of the present disclosure, a treatment fluid in the form of an invert emulsion including an aqueous internal phase, including an iodide brine, and an oil external phase is provided. The treatment fluid may be introduced into at least a portion of a well bore penetrating at least a portion of a subterranean formation.

Suitable treatment fluids may be in the form of an invert emulsion including an aqueous internal phase and an oil external phase. The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof.

In some embodiments of the present disclosure, a treatment fluid in the form of a water-based drill-in fluid is provided, wherein the water-based drill-in fluid includes an iodide brine. The water-based drill-in fluid may further include a viscosifier. The water-based drill-in treatment fluid may be introduced into at least a portion of a well bore penetrating at least a portion of a subterranean formation.

Among the many potential advantages to the methods and compositions of the present disclosure, only some of which are alluded to herein, the iodide brines may achieve a density of up to about 15.7 lb/gal. The iodide brines of the present disclosure are monovalent brines, and they may be compatible with formation brines. Furthermore, the iodide brines of the present disclosure may not implicate the scaling issues that can be implicated by the use of divalent brines. Additionally, since iodide is a reducing agent, the iodide brines may not be corrosive.

The iodide brines of the present disclosure may include one or more iodide salts at least partially dissolved in water or another aqueous fluid, such salts including but not limited to lithium iodide, sodium iodide, potassium iodide, rubidium iodide, cesium iodide, magnesium iodide, calcium iodide, strontium iodide, barium iodide, and any combination thereof. In a non-limiting example, one iodide salt may be used to prepare the brine. In some embodiments, multiple iodide salts may be used to prepare the iodide brine such that the iodide brine may be considered a single iodide brine, for example, including no additional salt or, if present, no more than about 1 wt. % based on the total weight of the iodide brine. In some examples, the brine may be free or essentially free of zinc bromide and cesium formate.

In some embodiments, the iodide brine of the present disclosure may have a density over about 13 lb/gal. In some embodiments, the iodide brine may have a density of about 13 lb/gal to about 16 lb/gal. In some embodiments, the iodide brine may have a density of about 14.3 lb/gal to about 15.2 lb/gal. In some embodiments, the iodide brine may have a density of about 15.2 lb/gal to about 15.7 lb/gal. In some embodiments, the invert-emulsion treatment fluids of the present disclosure may have a density over 10 lb/gal, and the water-based drill-in treatment fluids of the present disclosure may have a density over 14 lb/gal. In some embodiments, the invert-emulsion treatment fluids of the present disclosure may have a density of about 10-18 lb/gal, and the water-based drill-in treatment fluids of the present disclosure may have a density of about 14-20 lb/gal.

In some embodiments, the iodide brine further contains a crystallization inhibitor. A crystallization inhibitor may further extend the density range of the iodide brine. Any suitable crystallization inhibitor may be used, including glycols, sugar alcohols, inorganic salts, any derivative thereof, and any combination thereof. In some embodiments, the iodide brine containing a crystallization inhibitor may have a density of about 13.3 lb/gal to about 18.0 lb/gal. In some embodiments, the iodide brine may have a density of about 14.0 lb/gal to about 17.0 lb/gal. In some embodiments, the iodide brine may have a density of about 14.5 lb/gal to about 16.5 lb/gal.

Aqueous fluids that may be suitable for use in the methods and systems of the present disclosure may include water from any source, provided that it does not contain compounds that adversely affect other components of the treatment fluid. Such aqueous fluids may include fresh water, salt water (e.g., water containing one or more salts dissolved therein), seawater, or any combination thereof.

In some embodiments of the present disclosure a treatment fluid may be provided including an invert-emulsion fluid including an aqueous iodide brine internal phase and an oil external phase. The treatment fluid may be introduced into at least a portion of a well bore penetrating at least a portion of a subterranean formation. Without limitation, the iodide brine may be present in the aqueous internal phase in any suitable amount, including but not limited to, 80 wt. % to 100 wt. % based on a total weight of the aqueous internal phase. One or ordinary skill in the art, with the benefit of this disclosure, should be able to select an appropriate amount of the iodide brine for a particular application.

An example method of preparing an oil-based treatment fluid may include providing an iodide brine. The iodide brine may be obtained or prepared by dissolution of an iodide salt in water. In some embodiments, a crystallization inhibitor may be added to the iodide brine in any suitable manner, including but not limited to, adding the iodide brine and crystallization inhibitor to a mixer. Any suitable mixer may be used. In some embodiments, the crystallization inhibitor may be added to a mixing tank by way of a mixing hopper. The crystallization inhibitor may be added in bulk and/or in small packages. In some embodiments, an invert emulsion may then be prepared by combining the aqueous composition with a base oil, thereby forming an oil-based treatment fluid including an aqueous internal phase containing the iodide brine and an oil external phase.

In some embodiments, the invert emulsion may have an oil external phase to aqueous internal phase ratio of about 10:90. In some embodiments, the invert emulsion may have an oil external phase to aqueous internal phase ratio of about 99:1.

In some embodiments, the treatment fluid may further include an emulsifier. Any suitable emulsifier for emulsifying an aqueous fluid into an oil external phase may be used. Suitable emulsifiers may include but are not limited to, fatty amines, ethoxylated nonylphenols, fatty acids, fatty acid esters, tall oil, oxidized tall oil, modified tall oil, rosin acid, resin acid, and combinations thereof. In an embodiment, the emulsifier may be present in the treatment fluid in an amount of about 2 lb/bbl (6 kg/m$^3$) to about 24 lb/bbl (68 kg/m$^3$), or about 4 lb/bbl (11 kg/m$^3$) to about 20 lb/bbl (57 kg/m$^3$), or about 6 lb/bbl (17 kg/m$^3$) to about 16 lb/bbl (46 kg/m$^3$). In some embodiments, the emulsifiers used may be determined based on the hydrophilic-lipophilic balance "HLB" value of the emulsifying surfactant.

The hydrophilic-lipophilic balance ("HLB") of an emulsifier is a measure of the degree to which it is hydrophilic or lipophilic, determined by calculating a value based on the chemical groups of the molecule. This method is also referred to as the Davies HLB value. The advantage of this method is that it takes into account the effect of stronger and weaker hydrophilic groups. The method works as follows: $HLB=7+m*Hh-n*Hl$ where m is the number of hydrophilic groups in the molecule, Hh is the respective group HLB value of the hydrophilic groups, n is the number of lipophilic groups in the molecule, and Hl is the respective HLB value of the lipophilic groups.

The HLB model can be used for applications including emulsification, detergency, solubilization, and other applications. Typically, an HLB value will indicate the emulsifier properties, where a value of 1 to 3 indicates anti-foaming of aqueous systems, a value of 3 to 7 indicates water in oil emulsification, a value of 7 to 9 indicates wetting, a value of 8 to 28 indicates oil in water emulsification, a value of 11 to 18 indicates solubilization, and a value of 12 to 15 indicates detergency and cleaning. In an embodiment, the emulsifier used may have an HLB value of about 8 to about 28.

In some embodiments, the water-based drill-in fluid may further include a viscosifier. Any suitable viscosifier may be used in the treatment fluids of the present disclosure. Examples of such viscosifiers include, but are not limited to, xanthan gum, crosslinked starch, modified starch, modified hydroxyethylcellulose, crosslinked hydroxyethylcellulose, biopolymers, synthetic polymers, any derivatives thereof, and any combination thereof. Examples of biopolymers may include, but are not limited to, guar, scleroglucan, and diutan. Example of synthetic polymers may include lightly crosslinked water-soluble polymers, such as homopolymers or copolymers of acrylamide, acrylamidopropanesulfonic acid (AMPS), and N-vinylpyrrolidone (NVP). In some embodiments, the viscosifier may be present in the water-based drill-in fluid in an amount of about 0.5 lb/bbl (1.4 kg/m3) to about 24 lb/bbl (68 kg/m3), or about 1 lb/bbl (2.8 kg/m3) to about 20 lb/bbl (57 kg/m3), or about 2 lb/bbl (5.7 kg/m3) to about 16 lb/bbl (46 kg/m3).

In some embodiments, the water-based drill-in fluid of the present disclosure may further include a weighting agent. Addition of a weighting agent may help increase the density of the water-based drill-in fluid. Any suitable weighting agent may be used in the treatment fluids of the present disclosure. Examples of such weighting agents include, but are not limited to, calcium carbonate, magnesium carbonate, magnesium oxide, magnesium hydroxide, barite, manganese tetroxide, ilmenite, any derivatives thereof, and any combination thereof.

In some embodiments, the treatment fluids of the present disclosure optionally may include other salts. Examples of other salts that can be included in the treatment fluids of the present disclosure include, but are not limited to sodium chloride, sodium bromide, sodium formate, potassium formate, cesium formate, lithium bromide, potassium bromide, rubidium bromide, magnesium bromide, calcium bromide, calcium chloride, strontium bromide, zinc bromide, manganese (II) bromide, or any combinations thereof.

In some embodiments, the treatment fluid may be considered low solids or solids free. This may be particularly desirable, for example, where the treatment fluid may be used, for example, in completion applications or in a reservoir section of a wellbore (e.g., drill-in fluid). By using these low solids or solids free treatment fluids, formation damage may be minimized, in some instances. As used herein the term "solids free" means that a fluid (e.g., the oil-based treatment fluid) is free of intentionally added solids or, to the extent that intentionally added solids are present, the solids are present in an amount of less than 100 parts per million. It should be understood that minor amounts of solids may unintentionally be added to the fluid during use in a wellbore.

The treatment fluids of the present disclosure optionally may include any number of additives in combination with the iodide brines. Other examples of such additives include, but are not limited to, additional salts, weighting agents (other than salt), polymers, surfactants, fluorides, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, breakers, relative permeability modifiers, resins, particulate materials (e.g., proppant particulates), wetting agents, coating enhancement agents, filter cake removal agents, viscosifying agents, and the like. One or more of these additives (e.g., bridging agents) may include degradable materials that are capable of undergoing irreversible degradation downhole. In some embodiments, the treatment fluids of the present disclosure may include a low weight solid to act as a weighting agent. A person skilled in the art, with the benefit of this disclosure, will recognize the types of additives that may be included in the fluids of the present disclosure for a particular application. The treatment fluids of the present disclosure may be utilized in any well treatment fluid known in the art, including but not limited to, completion fluids, insulating packer fluids, drilling fluids (including reservoir drilling fluids (RDFs)), gravel packed fluids, and low solids oil-based completion fluids.

The compositions and treatment fluids of the present disclosure may be prepared by any suitable means known in the art. In some embodiments, the treatment fluids may be prepared at a well site or at an offsite location. In certain embodiments, the brines can be prepared by dissolving the salts into the water. Certain components of the fluid may be provided as a dry mix to be combined with fluid or other components prior to or during introducing the fluid into the well. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment. The system depicted in FIG. 1 (described below) may be one embodiment of a system and equipment used to accomplish on-the-fly or real-time mixing.

The methods and compositions of the present disclosure may be used during or in conjunction with any operation in a portion of a subterranean formation and/or wellbore, including but not limited to drilling operations, pre-flush treatments, after-flush treatments, hydraulic fracturing treatments, sand control treatments (e.g., gravel packing), "frac-pack" treatments, acidizing treatments (e.g., matrix acidizing or fracture acidizing), well bore clean-out treatments, cementing operations, workover treatments/fluids, and other operations where a treatment fluid may be useful. For example, the methods and/or compositions of the present disclosure may be used in the course of drilling operations in which a well bore is drilled to penetrate a subterranean formation. In certain embodiments, this may be accomplished using the pumping system and equipment used to circulate the drilling fluid in the well bore during the drilling operation, which is described below.

The treatment fluids of the present disclosure may be provided and/or introduced into the well bore or used to drill at least a portion of a well bore in a subterranean formation using any method or equipment known in the art. In certain embodiments, a treatment fluid of the present disclosure may be circulated in the well bore using the same types of pumping systems and equipment at the surface that are used to introduce drilling fluids and/or other treatment fluids or additives into a well bore penetrating at least a portion of the subterranean formation.

The methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods and compositions may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed methods and compositions also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods and compositions may also directly or indirectly affect any downhole heat exchangers, valves and corresponding actuation devices, tool seals, packers and other wellbore isolation devices or components, and the like associated with the wellbore 116. The disclosed methods and compositions may also directly or indirectly affect the drill bit 114, which may include, but is not limited to, roller cone bits, PDC bits, natural diamond bits, any hole openers, reamers, coring bits, etc.

The disclosed methods and compositions also may directly or indirectly affect the various equipment and/or tools (not shown) used at a well site or in drilling assembly 100 to detect various events, properties, and/or phenomena. Such equipment and/or tools may include, but are not limited to, pressure gauges, flow meters, sensors (e.g., float sensors used to monitor the level of drilling fluid in retention pit 132, downhole sensors, sensors in return flow line 130, etc.), seismic monitoring equipment, logging equipment, and the like.

While not specifically illustrated herein, the disclosed methods and compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example brines were prepared by dissolving the corresponding salts into water. Table 1 shows the densities and true crystallization temperature at atmospheric pressure (TCT) of the common monovalent brines compared to the iodide brines of the present disclosure.

| Composition | Density (lbm/gal) | Specific Gravity | TCT (° F.) |
|---|---|---|---|
| Currently Available Monovalent Brines | | | |
| Sodium Chloride (NaCl) | 10.0 | 1.200 | 25 |
| Sodium Bromide (NaBr) | 12.7 | 1.525 | 60 |
| Sodium Formate (HCOONa) | 10.9 | 1.309 | 59 |
| Potassium Formate (HCOOK) | 13.3 | 1.594 | 48 |
| Cesium Formate (HCOOCs) | 19.2 | 2.301 | 63 |
| Iodide Brines of the Present Disclosure | | | |
| Lithium Iodide (LiI) | 14.9 | 1.785 | 38 |
| Sodium Iodide (NaI) | 15.7 | 1.881 | 52 |
| Sodium Iodide (NaI) | 15.2 | 1.821 | 16 |
| Potassium Iodide (KI) | 14.3 | 1.714 | 62 |

In an embodiment of the present disclosure, a method includes providing a treatment fluid that includes an invert emulsion which has an aqueous internal phase and an oil external phase, wherein the aqueous internal phase comprises an iodide brine, and introducing the treatment fluid into at least a portion of a well bore penetrating at least a portion of a subterranean formation.

In certain embodiments, the iodide brine is selected from the group consisting of: lithium iodide, sodium iodide, potassium iodide, rubidium iodide, cesium iodide, magnesium iodide, calcium iodide, strontium iodide, barium iodide, and any combination thereof. In certain embodiments, the treatment fluid has a density over about 10 lb/gal. In certain embodiments, the treatment fluid has a density of about 10 lb/gal to about 18 lb/gal.

In certain embodiments, the treatment fluid further comprises a crystallization inhibitor, which can be selected from the group consisting of: alcohols, glycols, sugar alcohols, aldoses, ketoses, inorganic salts, amides, amino acids, sugar acids, any derivative thereof, and any combination thereof. In certain embodiments, the treatment fluid further comprises an emulsifier, which can be selected from the group consisting of: fatty amines, ethoxylated nonylphenols, fatty acids, fatty acid esters, tall oil, oxidized tall oil, modified tall oil, rosin acid, resin acid, any derivative thereof, and any combination thereof.

In certain embodiments, the treatment fluid further comprises an additional brine, which can be selected from the group consisting of: sodium chloride, sodium bromide, sodium formate, potassium formate, cesium formate, lithium bromide, potassium bromide, rubidium bromide, magnesium bromide, calcium bromide, calcium chloride, strontium bromide, zinc bromide, manganese (II) bromide, or any combinations thereof.

In an embodiment of the present disclosure, a method includes providing a water-based drill-in fluid, wherein the water-based drill-in fluid includes an iodide brine and a viscosifier, and introducing the water-based drill-in fluid into at least a portion of a well bore penetrating at least a portion of a subterranean formation.

In certain embodiments, the iodide brine is selected from the group consisting of: lithium iodide, sodium iodide, potassium iodide, rubidium iodide, cesium iodide, magnesium iodide, calcium iodide, strontium iodide, barium iodide, and any combination thereof. In certain embodiments, the viscosifier is selected from the group consisting of: xanthan gum, crosslinked starch, modified starch, modified hydroxyethylcellulose, crosslinked hydroxyethyl cellulose, biopolymers, synthetic polymer, any derivative thereof, and any combination thereof. In certain embodiments, the water-based drill-in fluid has a density over about 14 lb/gal.

In certain embodiments, the water-based drill-in fluid further includes a crystallization inhibitor selected from the group consisting of: alcohols, glycols, sugar alcohols, aldoses, ketoses, inorganic salts, amides, amino acids, sugar acids, any derivative thereof, and any combination thereof. In certain embodiments, the water-based drill-in fluid further includes a fluid loss control additive. In certain embodiments, the water-based drill-in fluid further includes a weighting agent selected from calcium carbonate, magnesium carbonate, magnesium oxide, magnesium hydroxide, barite, manganese tetroxide, ilmenite, any derivative thereof, and any combination thereof. In certain embodiments, the water-based drill-in fluid further includes an additional brine, which can be selected from the group consisting of: sodium chloride, sodium bromide, sodium formate, potassium formate, cesium formate, lithium bromide, potassium bromide, rubidium bromide, magnesium bromide, calcium bromide, calcium chloride, strontium bromide, zinc bromide, manganese (II) bromide, or any combinations thereof.

In an embodiment of the present disclosure, a method includes providing an oil-based treatment fluid in the form of an invert emulsion including an aqueous internal phase and an oil external phase, wherein the aqueous internal phase includes an iodide brine, wherein the iodide brine is selected from the group consisting of: lithium iodide, sodium iodide, potassium iodide, rubidium iodide, cesium iodide, magnesium iodide, calcium iodide, strontium iodide, barium iodide, and any combination thereof. The treatment fluid may further include a crystallization inhibitor selected from the group consisting of: alcohols, glycols, sugar alcohols, aldoses, ketoses, inorganic salts, amides, amino acids, sugar acids, any derivative thereof, and any combination thereof; and introducing the treatment fluid into at least a portion of a well bore penetrating at least a portion of a subterranean formation.

These and other aspects of the embodiments of the present disclosure will be apparent to one skilled in the art upon reading the following detailed description. While the embodiments of the present disclosure are susceptible to various modifications and alternative forms, specific embodiments thereof will be described in detail and shown by way of example. It should be understood, however, that it is not intended to limit the disclosure to the particular forms disclosed, but, on the contrary, the disclosure is to cover all modifications and alternatives falling within the scope of the disclosure as expressed in the appended claims.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "including," "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid in the form of an invert emulsion comprising an aqueous internal phase and an oil external phase, wherein the aqueous internal phase comprises an iodide brine having a density at or above about 13 lb/gal, and wherein the iodide brine comprises at least one salt selected from the group consisting of: lithium iodide, sodium iodide, potassium iodide, rubidium iodide, cesium iodide, magnesium iodide, calcium iodide, barium iodide, and any combination thereof; and
introducing the treatment fluid into at least a portion of a well bore penetrating at least a portion of a subterranean formation.

2. The method of claim 1, wherein the treatment fluid further comprises a crystallization inhibitor.

3. The method of claim 2 wherein the crystallization inhibitor is selected from the group consisting of: alcohols, glycols, sugar alcohols, aldoses, ketoses, inorganic salts, amides, amino acids, sugar acids, any derivative thereof, and any combination thereof.

4. The method of claim 1 wherein the iodide brine has a density of about 13.3 lb/gal to about 18 lb/gal.

5. The method of claim 1, wherein the treatment fluid further comprises an emulsifier.

6. The method of claim 5, wherein the emulsifier is selected from the group consisting of: fatty amines, ethoxylated nonylphenols, fatty acids, fatty acid esters, tail oil, oxidized tall oil, modified tall oil, rosin acid, resin acid, any derivative thereof, and any combination thereof.

7. The method of claim 1, wherein the treatment fluid further comprises an additional brine.

8. The method of claim 7 wherein the additional brine comprises at least one salt selected from the group consisting of: sodium chloride, sodium bromide, sodium formate, potassium formate, cesium formate, lithium bromide, potassium bromide, rubidium bromide, magnesium bromide, calcium bromide, calcium chloride, strontium bromide, zinc bromide, manganese (II) bromide, or any combinations thereof.

9. A method comprising:
providing a water-based drill-in fluid, wherein the water-based drill-in fluid comprises an iodide brine, wherein the water-based drill-in fluid further comprises a viscosifier, and wherein the iodide brine comprises at least one salt selected from the group consisting of: lithium iodide, sodium iodide, potassium iodide, rubidium iodide, cesium iodide, magnesium iodide, calcium iodide, barium iodide, and any combination thereof;
introducing the water-based drill-in fluid into at least a portion of a well bore penetrating at least a portion of a subterranean formation; and
using the water-based drill-in fluid to drill at least the portion of the well bore to penetrate at least a reservoir portion of the subterranean formation.

10. The method of claim 9 wherein the water-based drill-in fluid has a density over about 14 lb/gal.

11. The method of claim 9 wherein the viscosifier is selected from the group consisting of: xanthan gum, crosslinked starch, modified starch, modified hydroxyethylcellulose, crosslinked hydroxyethylcellulose, biopolymers, synthetic polymer, any derivative thereof, and any combination thereof.

12. The method of claim 9 wherein the water-based drill-in fluid further comprises a crystallization inhibitor selected from the group consisting of: alcohols, glycols, sugar alcohols, aldoses, ketoses, inorganic salts, amides, amino acids, sugar acids, any derivative thereof, and any combination thereof.

13. The method of claim 9, wherein the water-based drill-in fluid further comprises a fluid loss control additive.

14. The method of claim 9, wherein the water-based drill-in fluid further comprises a weighting agent selected from calcium carbonate, magnesium carbonate, magnesium oxide, magnesium hydroxide, barite, manganese tetroxide, ilmenite, any derivative thereof, and any combination thereof.

15. The method of claim 9, wherein the water-based drill-in fluid further comprises an additional brine.

16. The method of claim 15 wherein the additional brine comprises at least one salt selected from the group consisting of: sodium chloride, sodium bromide, sodium formate, potassium formate, cesium formate, lithium bromide, potassium bromide, rubidium bromide, magnesium bromide, calcium bromide, calcium chloride, strontium bromide, zinc bromide, manganese (II) bromide, or any combinations thereof.

17. A method comprising:
providing an oil-based treatment fluid in the form of an invert emulsion comprising an aqueous internal phase and an oil external phase, wherein the aqueous internal phase comprises an iodide brine having a density at or above about 13 lb/gal, wherein the iodide brine comprises at least one salt selected from the group consisting of: lithium iodide, sodium iodide, potassium iodide, rubidium iodide, cesium iodide, magnesium iodide, calcium iodide, barium iodide, and any combination thereof;
wherein the treatment fluid further comprises a crystallization inhibitor selected from the group consisting of: alcohols, glycols, sugar alcohols, aldoses, ketoses, inorganic salts, amides, amino acids, sugar acids, any derivative thereof, and any combination thereof; and
introducing the treatment fluid into at least a portion of a well bore penetrating at least a portion of a subterranean formation.

* * * * *